United States Patent
Lee et al.

(10) Patent No.: US 12,176,482 B1
(45) Date of Patent: Dec. 24, 2024

(54) SOLID ELECTROLYTE MEMBRANE, METHOD FOR MANUFACTURING THE SAME, AND ALL-SOLID-STATE BATTERY COMPRISING THE SAME

(71) Applicants: LG ENERGY SOLUTION, LTD., Seoul (KR); THE REGENTS OF THE UNIVERSITY OF CALIFORNIA, Oakland, CA (US)

(72) Inventors: Jung-Pil Lee, Daejeon (KR); Min-Sang Song, Daejeon (KR); Jiyoung Kim, Daejeon (KR); Dong Ju Lee, La Jolla, CA (US); Zheng Chen, San Diego, CA (US)

(73) Assignees: LG ENERGY SOLUTION, LTD., Seoul (KR); THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 0 days.

(21) Appl. No.: 18/390,298

(22) Filed: Dec. 20, 2023

(51) Int. Cl.
*H01M 10/0562* (2010.01)
*H01M 4/62* (2006.01)

(52) U.S. Cl.
CPC ....... *H01M 10/0562* (2013.01); *H01M 4/623* (2013.01)

(58) Field of Classification Search
None
See application file for complete search history.

(56) References Cited

U.S. PATENT DOCUMENTS

| | | | |
|---|---|---|---|
| 2018/0076478 A1* | 3/2018 | Mimura | H01M 10/0525 |
| 2018/0309167 A1 | 10/2018 | Kaga et al. | |
| 2020/0028156 A1 | 1/2020 | Zhang et al. | |
| 2023/0275261 A1 | 8/2023 | Ku et al. | |

FOREIGN PATENT DOCUMENTS

| | | |
|---|---|---|
| CN | 114243104 A | 3/2022 |
| JP | WO2020/036055 A1 | 2/2020 |
| KR | 10-2018-0093091 A | 8/2018 |
| KR | 10-2022-0048298 A | 4/2022 |

(Continued)

OTHER PUBLICATIONS

Calendaring-Wiktionary, available online at https://en.wiktionary.org/wiki/calendaring, date unknown.*

(Continued)

*Primary Examiner* — Anca Eoff
(74) *Attorney, Agent, or Firm* — Birch, Stewart, Kolasch & Birch, LLP (57) ABSTRACT

Disclosed is a solid electrolyte membrane, a method for manufacturing the same, and an all-solid-state battery containing the same. More specifically, the solid electrolyte membrane includes a first solid electrolyte layer and a second solid electrolyte layer stacked adjacent to each other, and the first solid electrolyte layer has a structure in which particulate binders are dispersed, and the second solid electrolyte layer has a structure in which fibrous binders are entangled or connected to each other, and thus the strength may be improved without lowering the ionic conductivity of the solid electrolyte membrane. The solid electrolyte membrane may be substantially free of solvent.

20 Claims, 4 Drawing Sheets

(56) References Cited

FOREIGN PATENT DOCUMENTS

WO    WO-2021039946 A1 *  3/2021    ............ C08L 101/00

OTHER PUBLICATIONS

Calendering-Britannica Online Encyclopedia, available online at https://www.britannica.com/technology/calendering, date unknown.*

Jiang, T., He, P., Wang, G., Shen, Y.., Nan, C.-W., Fan, L.-Z.- Solvent-Free Synthesis of Thin, Flexible, Nonflammable Garnet-Based Composite Solid Electrolyte for All-Solid-State Lithium Batteries, Ad.Energ.Mat.2020, 1903376 (Year: 2020).*

Nikodimos, Y., Ihrig, M., Taklu, B.W., Su, W.-N., Hwang, B.J.- Solvent-free fabrication of freestanding inorganic solid electrolyte membranes: Challenges, progress, and perspectives, Energy Storage Materials 63 (2023) 103030, available online Oct. 26, 2023 (Year: 2023).*

* cited by examiner

SOLID ELECTROLYTE MEMBRANE, METHOD FOR MANUFACTURING THE SAME, AND ALL-SOLID-STATE BATTERY COMPRISING THE SAME

TECHNICAL FIELD

The present disclosure relates to a solid electrolyte membrane and an all-solid-state battery comprising the same.

BACKGROUND ART

There continues to be an increase in electrified transportation, exemplified by the widespread adoption of electric vehicles (EVs) and the emergence of urban air mobility (UAM) vehicles. Simultaneously, there is a growing demand for stationary energy storage systems, notably in the residential and industrial sectors, powered by solar and wind generators. This shift is driven in part by the pressing need to mitigate the adverse environmental and climate impacts associated with traditional internal combustion engines and other non-renewable means of power generation. Thus, the development of battery technologies with high energy density, while also ensuring enhanced safety, has become an imperative.

From the viewpoint of limitations with respect to capacity, safety, output, large size, miniaturization, etc., of batteries, various batteries that may overcome the limitations of lithium secondary batteries are currently being studied.

On-going studies are being concentrated on different types of batteries. These include metal-air batteries that have large theoretical capacities and all-solid-state batteries have improved fire safety features. Also studied are supercapacitors in terms of output, NaS batteries or redox flow batteries (RFB) in terms of large size, and thin film batteries in terms of miniaturization.

The all-solid-state battery refers to a battery in which the liquid electrolyte used in the existing lithium secondary battery is replaced with a solid. Such all-solid-state batteries are safer since they do not use a flammable solvent, so there is no ignition or explosion likelihood caused by the decomposition reaction of a conventional electrolyte solution. In addition, in the case of the all-solid-state battery, since Li metal or Li alloy may be used as a material for the negative electrode, there may be an advantage that the energy density of the battery may be remarkably improved.

In the case of an all-solid-state battery, although safety may be improved by using a solid electrolyte, the ionic conductivity may be reduced. In addition, if a liquid electrolyte is used as a means to secure the ionic conductivity of the solid electrolyte, there may be a problem that the strength is reduced.

In general, in order to ensure the safety of an all-solid-state battery and at the same time prevent the performance and processability of the battery from deteriorating, both the ionic conductivity and strength of the solid electrolyte membrane must be maintained above a certain level.

Among solid electrolyte membranes developed to date, the results of technological development for a solid electrolyte that has both physical properties of ionic conductivity and strength are an area that may be improved. Further, as the demand for all-solid-state batteries increases, there is a need for the development of a solid electrolyte membrane with excellent ionic conductivity and strength.

In addition, within an all-solid-state battery, side reactions may occur at the interface between the solid electrolyte membrane containing a binder and the negative electrode. Such side reactions may result in a decrease in the performance of the battery. Accordingly, there is an increasing demand for solid electrolyte membranes that may prevent side reactions from occurring at the interface with the negative electrode.

PRIOR ART DOCUMENT

Patent Document (Patent Document 1) US Laid-open Patent Publication No. 2020/0028156

DISCLOSURE

Technical Problem

In order to solve the above problems, the inventors of the present disclosure have conducted various studies. As a result of such studies, it has been confirmed that with a solid electrolyte membrane in which two solid electrolyte layers are stacked, by varying the form of the binder contained in each of the respective two solid electrolyte layers, and applying such as a particulate binder and fibrous binder, respectively, the strength of the solid electrolyte membrane may be improved without decreasing the ionic conductivity, and side reactions at the interface with the negative electrode may be suppressed in the solid electrolyte layer containing the particulate binder.

Therefore, it is an object of the present disclosure to provide a solid electrolyte membrane with improved strength without reducing ionic conductivity and a method of manufacturing the same.

It is another object of the present disclosure to provide an all-solid-state battery comprising the solid electrolyte membrane.

Technical Solution

In order to achieve the above objects, the present disclosure provides a solid electrolyte membrane comprising a first solid electrolyte layer and a second solid electrolyte layer formed on one side of the first solid electrolyte layer, wherein the first solid electrolyte layer comprises a first solid electrolyte and a particulate binder, and wherein the second solid electrolyte layer comprises a second solid electrolyte and a fibrous binder, and wherein the solid electrolyte membrane is substantially free of solvent.

In one aspect of the present disclosure, the weight of the particulate binder may be 2% by weight or less based on the total weight of the first solid electrolyte layer.

In one aspect of the present disclosure, the weight of the fibrous binder may be 0.01 to 5% by weight based on the total weight of the second solid electrolyte layer.

In one aspect of the present disclosure, the particulate binder and the fibrous binder may each independently comprise at least one selected from the group consisting of polytetrafluoroethylene (PTFE), ethylene-vinyl acetate (EVA), styrene-ethylene-butylene-styrene (SEBS) and copolymers thereof.

In one aspect of the present disclosure, the first solid electrolyte or the second solid electrolyte may be a sulfide-containing solid electrolyte, a halide-containing solid electrolyte, or an oxide-containing solid electrolyte.

In one aspect of the present disclosure, the thickness of the solid electrolyte membrane may be 20 μm to 700 μm.

In one aspect of the present disclosure, the ionic conductivity of the solid electrolyte membrane may be 0.5 to 10 mS/cm.

In one aspect of the present disclosure, the solid electrolyte membrane may be solvent-free.

The present disclosure also relates to a method of manufacturing a solid electrolyte membrane, which includes manufacturing the first solid electrolyte layer and the second solid electrolyte layer, respectively, and then bonding the first solid electrolyte layer and the second solid electrolyte layer, wherein the first solid electrolyte layer is prepared by the following steps (A1) and (A2):
(A1) mixing first solid electrolyte particles and a first binder; and
(A2) applying a mixture obtained in step (A1) to a first calendaring process to form a first film, which is the first solid electrolyte layer,
wherein the second solid electrolyte layer is prepared by the following steps (B1) and (B2):
(B1) mixing second solid electrolyte particles and a second binder; and
(B2) applying a mixture obtained in step (B1) to a second calendaring process to form a second film, which is the second solid electrolyte layer, and
wherein the first binder becomes a particulate binder, and the second binder is fiberized during mixing to become a fibrous binder.

In one aspect of the present disclosure, the temperature of the first and second calendaring processes may be 50° C. to 200° C., respectively.

In one aspect of the present disclosure, the first calendaring process may be performed for 1 to 10 loops and the second calendaring process may be performed for 5 to 50 loops.

In one aspect of the present disclosure, the calendaring process may be performed uniaxially or biaxially.

The present disclosure also provides an all-solid-state battery comprising a positive electrode, a negative electrode, and the solid electrolyte membrane of claim 1 interposed between them.

In one aspect of the present disclosure, the first solid electrolyte layer of the solid electrolyte membrane may be adjacent to the negative electrode.

In one aspect of the present disclosure, the first solid electrolyte layer consists of the first solid electrolyte and the particulate binder, and the second solid electrolyte layer consists of the second solid electrolyte and the fibrous binder.

In one aspect of the present disclosure, no solvent is used in the preparation of the first and second solid electrolyte layers.

Advantageous Effects

According to the solid electrolyte membrane of the present disclosure, since two solid electrolyte layers each contain different types, in particular, a particulate binder and fibrous binder, are each manufactured in a dry manner and then bonded to form a double layer, there may be an effect of improving the strength without lowering the ionic conductivity.

In addition, in the all-solid-state battery comprising the solid electrolyte membrane of the present disclosure, since the solid electrolyte layer containing the particulate binder among the double layers comprised in the solid electrolyte membrane is placed in contact with the negative electrode, there may be an effect of minimizing side reactions at the interface between the solid electrolyte membrane and the negative electrode.

BEST MODE

Hereinafter, the present disclosure will be described in more detail to facilitate understanding of the present disclosure.

The terms and words used in the present specification and claims should not be construed as limited to ordinary or dictionary terms, and should be construed in a sense and concept consistent with the technical idea of the present disclosure, based on the principle that the inventor may properly define the concept of a term to describe their disclosure in the best way possible.

Solid Electrolyte Membrane

The present disclosure relates to a solid electrolyte membrane, wherein the solid electrolyte membrane includes a first solid electrolyte layer and a second solid electrolyte layer, but the shapes of the binders comprised in the first solid electrolyte layer and the second solid electrolyte layer are different.

Figure 1A:
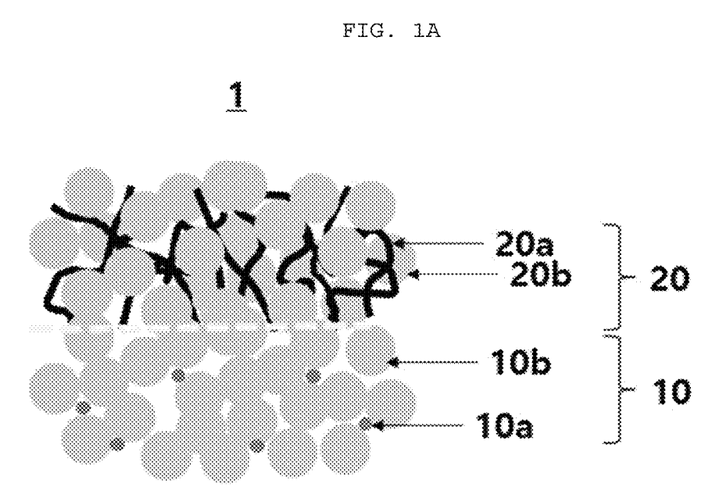
FIG. 1A is a schematic diagram showing a longitudinal cross-section of the solid electrolyte membrane according to an aspect of the present disclosure.

FIG. 1A is a schematic diagram showing a longitudinal cross-section of the solid electrolyte membrane according to an aspect of the present disclosure.

Referring to FIG. 1A, the solid electrolyte membrane 1 according to an aspect of the present disclosure is a solid electrolyte membrane 1 including the first solid electrolyte layer 10 and the second solid electrolyte layer 20 formed on one side of the first solid electrolyte layer 10, wherein the first solid electrolyte layer 10 includes the first solid electrolyte 10a and the particulate binder 10b, the second solid electrolyte layer 20 includes the second solid electrolyte 20a and the fibrous binder 20b.

Since the first solid electrolyte layer is adjacent to the negative electrode and the binder contained within the first solid electrolyte layer is particulate, contact with the negative electrode may be minimized, thereby reducing side reactions at the interface between the first solid electrolyte layer and the negative electrode.

The shape of the binder may be adjusted by the number of loops of the first calendaring process and the second calendaring process performed when manufacturing the first solid electrolyte layer and the second solid electrolyte layer. As the number of loops in the calendaring process increases, the binder may become a fibrous shape.

In one aspect of the present disclosure, the particulate binder may be contained in an amount of 2% by weight or less based on the total weight of the first solid electrolyte layer. The first solid electrolyte layer has a lower content of the binder than the adjacent second solid electrolyte layer. For this reason, when manufacturing the all-solid-state battery, if the first solid electrolyte layer is placed to be in contact with the negative electrode, the occurrence of side reactions at the interface with the negative electrode may be prevented.

Specifically, the content of the particulate binder may be 2% by weight or less, 1.9% by weight or less, 1.8% by weight or less, 1.7% by weight or less, 1.6% by weight or less, 1.5% by weight or less, 1.4% by weight or less, 1.3% by weight or less, 1.2% by weight or less, 1.1% by weight or less, 1% by weight or less, 0.9% by weight or less, 0.8% by weight or less, 0.7% by weight or less, 0.6% by weight or less, or 0.5% by weight or less. If the content of the particulate binder exceeds 2% by weight, the ionic conductivity of the solid electrolyte membrane may be decreased, and when the first solid electrolyte layer is placed to be in contact with the negative electrode inside the all-solid-state battery, the side reactions at the interface with the negative electrode may occur. The lower limit of the content of the particulate binder is not particularly limited, and may, for example, be 0.4% by weight, 0.3% by weight, 0.2% by weight or 0.1% by weight so long as it exceeds 0% by weight. While the content of the particulate binder being 2% weight or less is discussed herein, additional aspects of the disclosure may be implemented with higher particulate binder percentage weights, including up to 3% by weight, up to 4% by weight, or up to 5% by weight. In such additional aspects, the increased percentage weight of particulate binder is balanced against a corresponding lowering of percentage weight of the first solid electrolyte.

In addition, the particulate binder may have an average particle diameter ($D_{50}$) of 10 nm to 1 μm. If the average particle diameter ($D_{50}$) is less than 10 nm, the slurry preparing process for manufacturing the solid electrolyte membrane may not proceed smoothly. If the average particle diameter ($D_{50}$) exceeds 1 μm, it may be difficult to evenly distribute the binder within the solid electrolyte membrane.

$D_{50}$, as used herein, may be defined as a particle diameter at a cumulative volume of 50% in a particle size distribution curve (curve on the graph of a particle size distribution) of each particle. The $D_{50}$ may be measured, for example, by using a laser diffraction method. The laser diffraction method generally allows the measurement of a particle diameter ranging from a submicron level to a few mm and may produce highly repeatable and high-resolution results.

In one aspect of the present disclosure, the fibrous binder may be contained in an amount of 0.01 to 5% by weight, based on the total weight of the second solid electrolyte layer. The fibrous binder may also be contained in amounts (in % by weight) of 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, or 4.9, based on the total weight of the second solid electrolyte layer. While the content of the fibrous binder being 0.01 to 5% by weight is discussed herein, additional aspects of the disclosure may be implemented with higher fibrous binder percentage weights, including up to 5.5% by weight, up to 6.0% by weight, up to 6.5% by weight, or up to 7.0% by weight. In such additional aspects, the increased percentage weight of fibrous binder is balanced against a corresponding lowering of percentage weight of the second solid electrolyte.

If the content of the fibrous binder is less than 0.01% by weight, the strength of the solid electrolyte membrane may be decreased. If the content of the second fibrous binder exceeds 5% by weight, the ionic conductivity of the solid electrolyte membrane may be decreased.

In addition, the fibrous binder may have an aspect ratio of 10 to 10,000. If the aspect ratio is less than 10, the strength may be weakened because there is less cross-linked structure formed by the binder in the solid electrolyte membrane. If the aspect ratio exceeds 10,000, the time required for the manufacturing process may be increased. The cross-linked structure formed by the binder may be said to be a network structure that is entangled like a net.

In one aspect of the present disclosure, the particulate binder and the fibrous binder may each independently comprise at least one selected from the group consisting of polytetrafluoroethylene (PTFE), ethylene-vinyl acetate (EVA), styrene-ethylene-butylene-styrene (SEBS) and copolymers containing one or more of PTFE, EVA and SEBS. Additionally, the particulate binder and the fibrous binder may be the same or different from each other.

In one aspect of the present disclosure, the first solid electrolyte and the second solid electrolyte may each comprise at least one selected from the group consisting of a sulfide-containing solid electrolyte and a halide-containing solid electrolyte, and they may be the same or different from each other.

The sulfide-containing solid electrolyte may include at least one selected from the group consisting of LiPSX (X=Cl, Br or I), LiGePS, and LiPS. However, the sulfide-containing solid electrolytes are not limited to these, and sulfide-containing solid electrolytes commonly used in this field may be widely used.

Non-limiting examples of the sulfide-containing solid electrolyte may include Li—P—S-based glass, Li—P—S-based glass ceramic and argyrodite-based sulfide-containing solid electrolyte.

Non-limiting examples of the sulfide-containing solid electrolyte may include at least one of $xLi_2S$-$yP_2S_5$, $Li_2S$—$LiI$—$P_2S_5$, $Li_2S$—$LiI$—$Li_2O$—$P_2S_5$, $Li_2S$—$LiBr$—$P_2S_5$, $Li_2S$—$Li_2O$—$P_2S_5$, $Li_2S$—$Li_3PO_4$—$P_2S_5$, $Li_2S$—$P_2S_5$—$P_2O_5$, $Li_2S$—$P_2S_5$—$SiS_2$, $Li_2S$—$P_2S_5$—$SnS$, $Li_2S$—$P_2S_5$—$Al_2S_3$, $LizS$-$GeS_2$ or $Li_2S$—$GeS_2$—$ZnS$, $Li6PS5X$ (X=at least one of Cl, Br or I).

In an aspect of the present disclosure, the sulfide-containing solid electrolyte may comprise at least one selected from LPS-based glass or glass ceramic such as $xLi_2S$-$yP_2S_5$, or an argyrodite-based sulfide-containing solid electrolyte ($Li_6PS_5X$; X=Cl, Br, I). In an aspect of the present disclosure, the sulfide-containing solid electrolyte is $Li_6PS_5Cl$.

Additionally, the halide-containing solid electrolyte may be represented by Formula 1 below:

<Formula 1> wherein, M is a metal other than Li, a is 0<a<2, b is 0≤b≤6, c is 0≤c≤6, and b+c=6.

For example, the halide solid electrolyte may include at least one selected from the group consisting of $Li_3YBr_6$, $Li_3YCl_6$ and $Li_3YBr_2Cl_4$.

In addition, since the first solid electrolyte layer and the second solid electrolyte layer are both manufactured by a dry process, the first solid electrolyte layer may include of the first solid electrolyte and the particulate binder, and the second solid electrolyte layer may include of the second solid solid electrolyte and the fibrous binder. In one aspect, the first solid electrolyte layer may consist of the first solid electrolyte and the particulate binder, and the second solid electrolyte layer may consist of the second solid electrolyte and the fibrous binder.

In another aspect, no solvent is used in the preparation of the first and second solid electrolyte layers.

In an aspect of the disclosure, the solid electrolyte membrane is substantially free of solvent. The phrase "substantially free" allows for inclusion of minor amounts of solvent, such that the stated objectives of the disclosure may be satisfied. For instance, minor amounts of solvent may be allowed, such as less than 1% by weight based upon a total weight of the solid electrolyte membrane. Included in such amounts are less than 0.95% by weight, less than 0.90% by weight, less than 0.85% by weight, less than 0.80% by weight, less than 0.75% by weight, less than 0.70% by weight less than 0.65% by weight, less than 0.60% by weight, less than 0.55% by weight, less than 0.50% by weight, less than 0.45% by weight, less than 0.40% by weight, less than 0.35% by weight, less than 0.30% by weight, less than 0.25% by weight less than 0.20% by weight, less than 0.15% by weight, less than 0.10% by weight, less than 0.05% by weight, less than 0.02% by weight or less than 0.01% by weight, based on the total weight of the solid electrolyte membrane.

The content of the first solid electrolyte in the first solid electrolyte layer may be 98% by weight or more, and specifically, may be 98% by weight or more, 98.1% by weight or more, 98.2% by weight or more, 98.3% by weight or more, 98.4% by weight or more, 98.5% by weight or more, 98.6% by weight or more, 98.7% by weight or more, 98.8% by weight or more, 98.9% by weight or more, 99% by weight or more, 99.1% by weight or more, 99.2% by weight or more, 99.3% by weight or more, 99.4% by weight or more, or 99.5% by weight or more. If the content of the first solid electrolyte is less than 98% by weight, the ionic conductivity of the solid electrolyte membrane may be lowered. If the content of the first solid electrolyte exceeds 99.5% by weight, since the content of the particulate binder is relatively decreased, the strength of the solid electrolyte membrane may be decreased.

In addition, the content of the second solid electrolyte in the second solid electrolyte layer may be 95 to 99.99% by weight. The second solid electrolyte in the second solid electrolyte layer may be contained in amounts (in % by weight) of 95.1, 95.2, 95.3, 95.4, 95.5, 95.6, 95.7, 95.8, 95.9, 96.0, 96.1, 96.2, 96.3, 96.4, 96.5, 96.6, 96.7, 96.8, 96.9, 97.0, 97.1, 97.2, 97.3, 97.4, 97.5, 97.6, 97.7, 97.8, 97.9, 98.0, 98.1, 98.2, 98.3, 98.4, 98.5, 98.6, 98.7, 98.8, 98.9, 99.0, 99.1, 99.2, 99.3, 99.4, 99.5, 99.6, 99.7, 99.8, or 99.9, based on the total weight of the second solid electrolyte layer. If the content of the second solid electrolyte is less than 95% by weight, the strength of the solid electrolyte membrane may be decreased. If the content of the second solid electrolyte exceeds 99.99% by weight, the strength of the solid electrolyte membrane may be decreased.

In one aspect of the present disclosure, the thickness of the solid electrolyte membrane may be 20 μm to 700 μm. If the thickness of the solid electrolyte membrane is less than 20 μm, the strength is weak and thus the processability may be reduced, or a short circuit may occur during assembly and/or operation of the battery. If the thickness of the solid electrolyte membrane exceeds 700 μm, the energy density of the battery may be decreased.

In addition, the thickness of the first solid electrolyte layer adjacent to the negative electrode in the solid electrolyte membrane is 10 μm to 400 μm, and when the thickness is within the above range, side reactions at the interface with the negative electrode may be minimized. The thickness of the second solid electrolyte layer formed adjacent to the first solid electrolyte layer may be 10 μm to 500 μm.

In one aspect of the present disclosure, the ionic conductivity of the solid electrolyte membrane may be 0.5 to 10 mS/cm. Specifically, the ionic conductivity may be 0.5 mS/cm or more, 0.6 mS/cm or more. 0.8 mS/cm or more, 1 mS/cm or more, 1.5 mS/cm or more, 1.6 mS/cm or more, 1.7 mS/cm or more, 1.8 mS/cm or more, 1.9 mS/cm or more or 2 mS/cm or more, and may be 3 mS/cm or less, 5 mS/cm or less, 8 mS/cm or less or 10 mS/cm or less. The ionic conductivity may be measured at room temperature (25° C.).

In one aspect of the present disclosure, the tensile strength of the solid electrolyte membrane may be 45 to 1000 kPa. Specifically, the tensile strength may be 45 kPa or more, 50 kPa or more, 80 kPa or more, 100 kPa or more, 120 kPa or more or 150 kPa or more, and may be 200 kPa or less, 300 kPa or less, 500 kPa or less, 700 kPa or less, 900 kPa or less or 1000 kPa or less.

In one aspect of the present disclosure, the solid electrolyte membrane may be solvent-free.

Both the first and second solid electrolyte layers included in the solid electrolyte membrane may be manufactured by a dry process that does not substantially use a solvent and preferably is free of solvent. For example, the first solid electrolyte layer is manufactured by a dry process of physically mixing the first solid electrolyte and the first binder, and thus does not contain any substantial amount of solvent and is preferably free of solvent. In addition, the particulate binder formed during the dry process is dispersed in the first solid electrolyte layer. Accordingly, the first solid electrolyte layer with improved strength may be manufactured by the structure formed by the particulate binder formed during the dry process. The second solid electrolyte layer may also be manufactured in the same way. The strength of the solid electrolyte membrane formed by bonding the first solid electrolyte layer and the second solid electrolyte prepared in this way may be improved.

In addition, since a separate solvent is preferably not used, it is possible to prevent the solvent from destroying the crystal structure of the sulfide-containing and/or halide-containing solid electrolyte, thereby lowering the ionic conductivity.

Generally, the wet process used to manufacture the solid electrolyte membrane uses a solvent that can dissolve the binder, which is placed between the solid electrolyte particles and causes them to have an adhesive force. The solvent used in the existing wet process is a polar solvent such as N-methyl-2-pyrrolidone (NMP), water, or ethanol, and such a polar solvent can dissolve the binder and thus is suitable for wet processes. However, since the polar solvent reacts with the sulfide-containing solid electrolyte, it was difficult to use the polar solvent and the sulfide-containing solid electrolyte together. Accordingly, as a solvent for a wet process that may be used with a sulfide-containing solid electrolyte, a solvent such as xylene or anisole that does not react with the sulfide-containing solid electrolyte is used. In addition, in the wet process using solvents such as xylene or anisole, nitrile-butadiene rubber (NBR), styrene ethylene/butylene styrene (SEBS), etc. are used as binders that dissolve in these solvents.

On the other hand, the dry process according to the present disclosure influences the nature of the first and second binder (e.g., particulate first binder and fiberizing second binder from an initial particle form by physically stretching it) without using a solvent. Therefore, the structure of the binders in the manufactured solid electrolyte membrane is different from the structure formed by the wet process. Further, the physical properties of the solid electrolyte membrane may also be improved compared to solid electrolyte membranes manufactured by the wet process. In the above, the binder in the initial particle form is physically transformed by shear force during the mixing step with electrolyte particles. In order to induce this physical transformation, a mortar, ball mill or roll press may be introduced during mixing. In addition, as a binder that may well induce physical deformation, a binder that is physically very weak and fiberizes relatively well, such as PTFE, may be used.

Method for Manufacturing Solid Electrolyte Membrane

The present disclosure also relates to a method for manufacturing a solid electrolyte membrane.

The method for manufacturing a solid electrolyte membrane according to the present disclosure manufactures a solid electrolyte membrane by preparing the first solid electrolyte layer and the second solid electrolyte layer, respectively, and then joining them.

The first solid electrolyte layer is prepared by the following steps (A1) and (A2):
(A1) mixing first solid electrolyte particles and a first binder; and
(A2) applying the mixture obtained in step (A1) to a first calendaring process to form the first solid electrolyte layer.

The second solid electrolyte layer is prepared by the following steps (B1) to (B2):
(B1) mixing a second solid electrolyte and a second binder; and
(B2) applying the mixture obtained in step (B1) to a second calendaring process to form the second solid electrolyte layer.

The first binder and the second binder are modified during mixing to become the particulate binder and the fibrous binder, respectively.

The first and second solid electrolyte and the respective particulate binder and fibrous binder materials and their contents are the same as described herein.

The shape of the binder may be adjusted by the number of loops of the first calendaring process and the second calendaring process performed when manufacturing the first solid electrolyte layer and the second solid electrolyte layer. As the number of loops in the calendaring process increases, the binder may become a fibrous shape.

In addition, the particulate binder and the fibrous binder may be substantially the same in terms of their constituent materials, with only the shape of the binder being different before and after the dry process.

In addition, the calendaring process refers to a process of forming the material given to the calendering process into a film shape using two rollers. The pressure applied during the calendering process may be 5 MPa to 200 MPa.

In addition, the calendaring process refers to a process of forming the material given to the calendaring process into a film shape using two rollers. The pressure applied during the calendering process may be 5 MPa to 200 MPa.

In one aspect of the present disclosure, the method of bonding the first solid electrolyte layer and the second solid electrolyte layer is not particularly limited as long as it is a bonding method that may form a double layer in a stacked form where the first solid electrolyte layer and the second solid electrolyte layer are adjacent to each other.

For example, the first solid electrolyte layer and the second solid electrolyte layer may be bonded by simply stacking them, or they may be bonded by pressing them after stacking them.

In one aspect of the present disclosure, the temperature of the first and second calendaring processes may be 50° C. to 200° C., respectively. Specifically, the temperature may be 50° C. or higher, 70° C. or higher, or 80° C. or higher, and may be 100° C. or lower, 120° C. or lower, 140° C. or lower, 160° C. or lower, 180° C. or lower or 200° C. or lower. If the temperature is less than 50° C., the strength of the solid electrolyte membrane may decrease due to less fiberization of the binder. If the temperature exceeds 200° C., the strength of the solid electrolyte membrane may be no longer increased even if the temperature rises, or the electrolyte or the binder material may be deteriorated.

In one aspect of the present disclosure, the first calendaring process may be performed for 1 to 10 loops, and the second calendaring process may be performed for 5 to 50 loops. Specifically, if the loop of the first calendaring process is less than 1, the binder may not improve the adhesive force between solid electrolyte particles. If the number of loops in the first calendaring process exceeds 10 loops, as the degree of fiberization of the binder is increased, the binder is fiberized, and thus the side reactions at the interface between the fibrous binder and the negative electrode inside the first solid electrolyte layer adjacent to the negative electrode may be increased. In addition, if the number of loops in the second calendaring process is 5 to 10, the fiberization of the binder may not be smooth, but in this case, if the content of the binder is increased, the binder may be sufficiently fiberized due to friction between binders even if the number of loops is reduced. Therefore, when the loop of the second calendaring process is 5 to 10, the content of the second binder may be set to 2 to 5% by weight so that the second binder may be sufficiently fiberized. However, even if the content of the second binder is increased, if the number of loops in the second calendaring process is less than 5, the binder may be less fibrous, and thus the strength of the solid electrolyte membrane may be decreased. In addition, if the number of loops in the second calendaring process exceeds 50, the strength of the solid electrolyte membrane may be no longer increased even if the number of loops is increased, or the processability may be deteriorated. The number of loops of the first calendaring process may be 1 or more, 2 or more, or 3 or more, and may be 8 or less, 9 or less, or 10 or less. The number of loops of the second calendaring process may be 5 or more, 10 or more, 15 or more, 20 or more, 23 or more, or 25 or more, and may be 35 or less, 40 or less, 45 or less, or 50 or less.

In one aspect of the present disclosure, the orientation of the first and second calendaring processes may be performed uniaxially or biaxially. At this time, uniaxial means that the calendaring direction proceeds in one direction, and biaxial means that the calendaring proceeds in one direction and then proceeds alternately in the horizontal and vertical directions of the solid electrolyte membrane.

If the calendaring process is performed biaxially, the fiberization progresses evenly in multiple directions, which may further improve the strength of the solid electrolyte membrane.

In the method of manufacturing a solid electrolyte membrane as described above, both the first solid electrolyte layer and the second solid electrolyte layer were manufactured by a dry process substantially without using a solvent, but the method is not limited thereto. For example, in an alternative, the first solid electrolyte layer may be manufactured by a wet process through a slurry coating process using a particulate binder. Alternatively, the second solid electrolyte layer may be manufactured by a wet process through a slurry coating process using a fibrous binder whose shape as the binder raw material itself is fibrous. Alternatively, the second solid electrolyte layer may be manufactured by a dry process using a fibrous binder, which has a fibrous shape as the binder raw material itself. In this case, when manufacturing the first or the second solid electrolyte layer by a wet process, the binder must contain a certain content or more based on the total weight of the first or the second solid electrolyte layer to be formed into a film. For example, the binder may be contained in an amount of 2% by weight or more based on the total weight of the first or the second solid electrolyte layer.

All-Solid-State Battery

The present disclosure also relates to an all-solid-state battery including the above solid electrolyte membrane.

The all-solid-state battery according to the present disclosure includes the solid electrolyte membrane; a positive electrode formed on one side of the solid electrolyte membrane; and a negative electrode formed on the other side of the solid electrolyte membrane.

As described above, the solid electrolyte membrane comprises the first solid electrolyte layer and the second solid electrolyte layer formed on one side of the first solid electrolyte layer, and the first solid electrolyte layer contains a particulate binder, and the second solid electrolyte layer contains a fibrous binder.

The all-solid-state battery may be formed by allowing the first solid electrolyte layer containing the particulate binder among the first and second solid electrolyte layers included in the solid electrolyte membrane to contact, for instance, directly contact, the negative electrode.

The second solid electrolyte layer contains the fibrous binder. The fibrous binders tend to become entangled or connected to each other to form a net-shaped three-dimensional structure. The second solid electrolyte layer may have many net-shaped three-dimensional structures formed by the fibrous binder. If the second solid electrolyte layer comes into contact with the negative electrode, side reactions may occur centered on the net-shaped three-dimensional structure caused by the fibrous binder at the interface between the second solid electrolyte layer and the negative electrode.

Figure 1B:
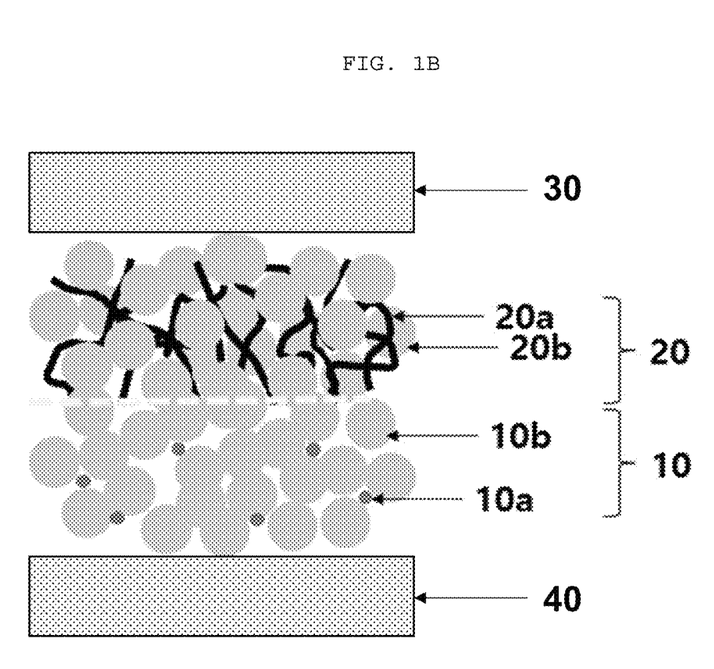
FIG. 1B is a schematic diagram illustrating a longitudinal cross-section of the all-solid-state battery including the solid electrolyte membrane according to an aspect of the present disclosure.

FIG. 1B is a schematic diagram illustrating a longitudinal cross-section of all-solid-state battery including the solid electrolyte membrane according to an aspect of the present disclosure.

Similar to FIG. 1A, in FIG. 1B, the solid electrolyte membrane includes the first solid electrolyte layer 10 and the second solid electrolyte layer 20 formed on one side of the first solid electrolyte layer 10, wherein the first solid electrolyte layer 10 includes the first solid electrolyte 10a and the particulate binder 10b, the second solid electrolyte layer 20 includes the second solid electrolyte 20a and the fibrous binder 20b. In the all-solid-state battery, the solid electrolyte membrane is interposed between the positive electrode 30 and the negative electrode 40, such that the first solid electrolyte layer 10 containing the particulate binder 10b, contacts, for instance, directly contacts, the negative electrode 40.

Therefore, in order to prevent side reactions at the interface between the solid electrolyte membrane and the negative electrode, an all-solid-state battery may be manufactured by ensuring that the first solid electrolyte layer containing the particulate binder and the negative electrode are adjacent to each other.

In one aspect of the present disclosure, the positive electrode may include a positive electrode active material, a conductive material, and a binder.

In the present disclosure, the positive electrode included in the all-solid-state battery comprises a positive electrode active material layer, and the positive electrode active material layer may be formed on one side or both sides of a positive electrode current collector.

The positive electrode active material layer comprises a positive electrode active material, a conductive material, and a binder.

In addition, the positive electrode active material is not particularly limited as long as it is a material capable of reversibly intercalating and de-intercalating lithium ions, and for example, may be, but is not limited to, layered compounds or compounds substituted with one or more transition metals, such as lithium cobalt oxide ($LiCoO_2$), lithium nickel oxide ($LiNiO_2$), $Li[Ni_xCo_yMn_zM_v]O_2$ (wherein, M is any one or two or more elements selected from the group consisting of Al, Ga and In; $0.3 \le x<1.0$, $0 \le y$, $z \le 0.5$, $0 \le v \le 0.1$, $x+y+z+v=1$), $Li(Li_aM_{b-a-b}M'_b)O_{2-c}A_c$ (wherein, $0 \le a \le 0.2$, $0.6 \le b \le 1$, $0 \le b' \le 0.2$, $0 \le c \le 0.2$; M comprises Mn and at least one selected from the group consisting of Ni, Co, Fe, Cr, V, Cu, Zn and Ti; M' is at least one selected from the group consisting of Al, Mg and B, and A is at least one selected from the group consisting of P, F, S and N); lithium manganese oxide such as Formula $Li_{1+y}Mn_{2-y}O_4$ (wherein, y is 0 to 0.33), $LiMnO_3$, $LiMn_2O_3$, $LiMnO_2$; lithium copper oxide ($Li_2CuO_2$); vanadium oxide such as $LiV_3O_8$, $LiFe_3O_4$, $V_2O_5$, $Cu_2V_2O_7$; Ni site type lithium nickel oxide represented by Formula $LiNi_{1-y}MyO_2$ (wherein, M is Co, Mn, Al, Cu, Fe, Mg, B or Ga, y is 0.01 to 0.3); lithium manganese composite oxide represented by Formula $LiMn_{2-y}M_yO_2$ (wherein, M is Co, Ni, Fe, Cr, Zn or Ta, y is 0.01 to 0.1) or $Li_2Mn_3MO_8$ (wherein, M is Fe, Co, Ni, Cu or Zn); $LiMn_2O_4$ in which part of Li in the Formula is substituted with alkaline earth metal ions; disulfide compounds; $Fe_2(MoO_4)_3$.

In addition, the positive electrode active material may be contained in an amount of 60 to 80% by weight based on the total weight of the positive electrode active material layer. Specifically, the content of the positive electrode active material may be 60% by weight or more or 68% by weight or more, and may be 72% by weight or less, 75% by weight or less or 80% by weight or less. If the content of the positive electrode active material is less than 60% by weight, the performance of the battery may be deteriorated. If the content of the positive electrode active material exceeds 80% by weight, mass transfer resistance may be increased.

In addition, the conductive material is not particularly limited as long as it has excellent electrical conductivity without causing side reactions in the internal environment of the all-solid-state battery and without causing chemical changes in the battery. The electrically conductive material may be typically graphite or conductive carbon, and for example, as the electrically conductive material, graphite such as natural graphite, artificial graphite; carbon black such as carbon black, acetylene black, Ketjen™ black (e.g., pure carbon black), Denka™ black (e.g., acetylene black), thermal black, channel black, furnace black, lamp black; carbon-containing materials whose crystal structure is graphene or graphite; electrically conductive fibers such as carbon fibers and metal fibers; carbon fluoride; metal powders such as aluminum powder and nickel powder; electrically conductive whiskers such as zinc oxide and potassium titanate; electrically conductive oxides such as titanium oxide; and electrically conductive polymers such as polyphenylene derivatives may be used alone or in combination of two or more thereof, but is not necessarily limited thereto. Preferably, the electrically conductive material may include vapor-grown carbon fiber (VGCF).

The conductive material may be generally contained in an amount of 1% by weight to 5% by weight based on the total weight of the positive electrode active material layer, and specifically, the content of the conductive material may be 1% by weight or more, 1.5% by weight or more or 2% by weight or more, and may be 4% by weight or less, 4.5% by weight or less or 5% by weight or less. If the content of the conductive material is too small, i.e., less than 1% by weight, it is difficult to expect an effect of improving electrical conductivity or the electrochemical properties of the battery may be deteriorated. If the content of the conductive material exceeds 5% by weight and thus is too large, the amount of the positive electrode active material may be relatively small, so that the capacity and energy density may be lowered. A method for incorporating the conductive material to the positive electrode is not particularly limited, and a conventional method known in the art, such as mixing with the positive electrode active material or coating on it, may be used.

In addition, the binder is a component that assists in bonding between the positive electrode active material and the conductive material, and assists in bonding to the current collector, and may comprise at least one selected from the group consisting of styrene butadiene rubber, acrylated styrene butadiene rubber, acrylonitrile copolymer, acrylonitrile-butadiene rubber, nitrile butadiene rubber, acrylonitrile-styrene-butadiene copolymer, acrylic rubber, butyl rubber, fluorine rubber, polytetrafluoroethylene, polyethylene, polypropylene, ethylene/propylene copolymer, polybutadiene, polyethylene oxide, chlorosulfonated polyethylene, polyvinyl pyrrolidone, polyvinyl pyridine, polyvinyl alcohol, polyvinyl acetate, polyepichlorohydrin, polyphosphazene, polyacrylonitrile, polystyrene, latex, acrylic resin, phenolic resin, epoxy resin, carboxymethyl cellulose, hydroxypropyl cellulose, cellulose acetate, cellulose acetate butyrate, cellulose acetate propionate, cyanoethyl cellulose, cyanoethyl sucrose, polyester, polyamide, polyether, polyimide, polycarboxylate, polycarboxylic acid, polyacrylic acid, polyacrylate, lithium polyacrylate, polymethacrylic acid, polymethacrylate, polyacrylamide, polyurethane, polyvinylidene fluoride, and poly(vinylidene fluoride)-hexafluoropropene. Preferably, the binder may comprise polytetrafluoroethylene (PTFE).

In addition, the binder may be contained in an amount of 0.5% by weight to 4% by weight based on the total weight of the positive electrode active material layer, and, specifically, the content of the binder may be 0.5% by weight or more, 1% by weight or more or 1.5% by weight or more, and may be 3% by weight or less, 3.5% by weight or less or 4% by weight or less. If the content of the binder is less than 0.5% by weight, the adhesive force between the positive electrode active material and the positive electrode current collector may be lowered. If the content of the binder exceeds 4% by weight, the adhesive force is improved, but the content of the positive electrode active material is reduced by that amount, and thus the capacity of the battery may be lowered.

In addition, the positive electrode current collector supports the positive electrode active material layer, and serves to transfer electrons between the external conductive wire and the positive electrode active material layer.

The positive electrode current collector is not particularly limited as long as it has high electrical conductivity without causing chemical changes in the all-solid-state battery. For example, as the positive electrode current collector, copper, stainless steel, aluminum, nickel, titanium, palladium, sintered carbon; a copper or stainless steel surface-treated with carbon, nickel, silver, etc.; an aluminum-cadmium alloy, etc. may be used.

The positive electrode current collector may have a fine irregularity structure on the surface of the positive electrode current collector or have a three-dimensional porous structure, in order to strengthen the bonding force with the positive electrode active material layer. Accordingly, the positive electrode current collector may include various forms such as a film, a sheet, a foil, a mesh, a net, a porous body, a foam, and a non-woven fabric.

The positive electrode as described above may be prepared by the conventional method, and specifically, the positive electrode may be manufactured by coating and drying a composition for forming the positive electrode active material layer prepared by mixing the positive electrode active material, the conductive material and the binder in an organic solvent, onto the positive electrode current collector, and optionally compression-molding it onto the positive electrode current collector to improve the density of the electrode. At this time, as the organic solvent, it is preferable to use one that may uniformly disperse the positive electrode active material, the binder, and the conductive material and that evaporates easily. Specifically, acetonitrile, methanol, ethanol, tetrahydrofuran, water, isopropyl alcohol and the like are exemplified.

In the present disclosure, the negative electrode included in the all-solid-state battery comprises a negative electrode active material layer, and the negative electrode active material layer may be formed on one side or both sides of a negative electrode current collector. The negative electrode active material layer may contain a negative electrode active material, a binder, and a conductive material.

The negative electrode active material may include a material capable of reversibly intercalating or de-intercalating lithium ion ($Li^+$), a material capable of reversibly forming a lithium-containing compound by reacting with lithium ions, and a lithium metal or a lithium alloy.

The material capable of reversibly intercalating or de-intercalating lithium ion ($Li^+$) may be, for example, crystalline carbon, amorphous carbon or mixtures thereof. The material capable of reacting with lithium ion ($Li^+$) to reversibly form a lithium-containing compound may be, for example, tin oxide, titanium nitrate or silicon. The lithium alloy may be, for example, an alloy of lithium (Li) and the metal selected from the group consisting of indium (In), sodium (Na), potassium (K), rubidium (Rb), cesium (Cs), francium (Fr), beryllium (Be), magnesium (Mg), calcium (Ca), strontium (Sr), barium (Ba), radium (Ra), aluminum (Al), and tin (Sn).

Preferably, the negative electrode active material may be lithium metal or lithium-indium alloy (Li—In), and specifically, may be in the form of lithium metal or lithium and a thin film or a lithium-indium alloy thin film or powder.

The negative electrode active material may be contained in an amount of 40 to 80% by weight based on the total weight of the negative electrode active material layer. Specifically, the content of the negative electrode active material may be 40% by weight or more or 50% by weight or more, and may be 70% by weight or less or 80% by weight or less. If the content of the negative electrode active material is less than 40% by weight, the connectivity between the wet negative electrode active material layer and the dry negative electrode active material layer may be insufficient. If the content of the negative electrode active material exceeds 80% by weight, mass transfer resistance may be increased.

In addition, the binder is the same as described above for the positive electrode active material layer.

In addition, the conductive material is the same as described above for the positive electrode active material layer.

In addition, the negative electrode current collector is not particularly limited as long as it has conductivity without causing chemical change in the battery, and for example, the negative electrode current collector may be copper, stainless steel, aluminum, nickel, titanium, sintered carbon; copper or stainless steel surface-treated with carbon, nickel, titanium, silver, etc.; or aluminum-cadmium alloy. In addition, the negative electrode current collector may be used in various forms, such as a film having a fine irregularity structure on its surface, a sheet, a foil, a net, a porous body, a foam, and a non-woven fabric, as in the positive electrode current collector.

The manufacturing method of the negative electrode is not particularly limited, and may be manufactured by forming a negative electrode active material layer on a negative electrode current collector using a layer or film formation method commonly used in the art. For example, a method such as pressing, coating, or vapor deposition may be used. Also, a case where a thin film of a metal lithium is formed on a metal plate by initial charging after assembling the battery without a lithium thin film on the negative electrode current collector is also included in the negative electrode of the present disclosure.

Method for Manufacturing all-Solid-State Battery

The present disclosure also relates to a method for manufacturing an all-solid-state battery.

The method for manufacturing an all-solid-state battery according to the present disclosure includes the steps of (P1) forming a positive electrode on one side of the solid electrolyte membrane by placing a mixture for forming a positive electrode active material layer on one side of the solid electrolyte membrane and pressurizing it; and (P2) placing a negative electrode on the other side of the solid electrolyte membrane and pressurizing it. In this case, the solid electrolyte membrane includes the first solid electrolyte layer and the second solid electrolyte layer formed on one side of the first solid electrolyte layer, and the first solid electrolyte layer contains a particulate binder, and the second solid electrolyte layer contains a fibrous binder.

The all-solid-state battery may be manufactured by ensuring that the first solid electrolyte layer comprised in the solid electrolyte membrane and the negative electrode are adjacent to each other. In this case, the particulate binder included in the first solid electrolyte layer exists in a dispersed form inside the first solid electrolyte layer, and does not form a net-shaped three-dimensional structure entangled or connected to each other like a fibrous binder, and thus the side reactions may be prevented at the interface between the first solid electrolyte layer and the negative electrode.

In the step (P1), a mixture for forming a positive electrode active material layer may be placed on one side of the solid electrolyte membrane and pressurized at high temperature to form a positive electrode on one side of the solid electrolyte membrane.

The mixture for forming the positive electrode active material layer may include a positive electrode active material, a conductive material, and a binder. Their specific types and weights are as described herein. In addition, the positive electrode may be manufactured by forming the positive electrode active material layer and then attaching the current collector.

In addition, the pressurizing process is intended to bond the solid electrolyte membrane and the positive electrode by reducing the interface resistance, and may be performed at a pressure of 300 MPa to 500 MPa. The pressure of the pressurizing process at the high temperature may be 300 MPa or more, 350 MPa or more, or 400 MPa or more, and may be 450 MPa or less, 470 MPa or less, or 470 MPa or less. If the temperature and/or pressure of the pressurizing process at the high temperature is below the above range, the solid electrolyte membrane and the positive electrode may not be integrated. If the temperature and/or pressure of the pressurizing process at the high temperature exceeds the above range, the solid electrolyte membrane or the positive electrode may be deformed or damaged.

In step (P2), the all-solid-state battery may be manufactured by placing the negative electrode on the other side of the solid electrolyte membrane and pressurizing it. The description of the negative electrode is the same as described above.

The pressure during pressurization may be 40 MPa to 80 MPa. Specifically, the pressure during pressurization may be 40 MPa or more, 45 MPa or more, or 50 MPa or more, and may be 70 MPa or less, 75 MPa or less, or 80 MPa or less. If the pressure during pressurization is less than 40 MPa, the interface resistance between the negative electrode and the solid electrolyte membrane may be increased. If the pressure during pressurization exceeds 80 MPa, the solid electrolyte or the negative electrode may be deformed or damaged.

Since the all-solid-state battery manufactured in this way contains a thin solid electrolyte, the manufacturing cost may be reduced and ion conductance and energy density may be improved.

In addition, since the solid electrolyte and the positive electrode are integrated through a pressurizing process at high temperature, interfacial stability may be improved.

Battery Module

The present disclosure also relates to a battery module comprising the all-solid-state battery as a unit cell, a battery pack comprising the battery module, and a device comprising the battery pack as a power source.

In this case, a specific example of the device may be a power tool powered by an electric motor; electric cars comprising an electric vehicle (EV), a hybrid electric vehicle (HEV), a plug-in hybrid electric vehicle (PHEV), and the like; an electric motorcycle including an electric bike (E-bike) and an electric scooter (E-scooter); an electric golf cart; and a power storage system, but is not limited thereto.

Hereinafter, preferred examples are presented to help the understanding of the present disclosure. However, the following examples are merely illustrative of the present disclosure, and it is obvious to those skilled in the art that various changes and modifications are possible within the scope and spirit of the present disclosure, and it is natural that these changes and modifications fall within the scope of the appended claims.

In the following examples and comparative examples, a solid electrolyte membrane and an all-solid-state battery were manufactured according to the composition and process as shown in Tables 1-1 and 1-2 below.

TABLE 1-1

| | First solid electrolyte layer | | | |
|---|---|---|---|---|
| | First solid electrolyte | | First binder | |
| | Material | Content (% by weight) | Material | Content (% by weight) |
| Example 1 | $Li_6PS_5Cl$ | 99.8 | PTFE | 0.2 |
| Example 2 | $Li_6PS_5Cl$ | 99.8 | PTFE | 0.2 |
| Example 3 | $Li_6PS_5Cl$ | 99.8 | PTFE | 0.2 |
| Comparative Example 1 (wet) | $Li_6PS_5Cl$ | 99.8 | PTFE | 0.2 |
| Comparative Example 2 (wet) | $Li_6PS_5Cl$ | 98 | SEBS | 2 |
| Comparative Example 3 | $Li_6PS_5Cl$ | 99.8 | PTFE | 0.2 |
| Comparative Example 4 | — | — | — | — |
| Comparative Example 5 | — | — | — | — |

TABLE 1-2

| | Second solid electrolyte layer | | | | |
|---|---|---|---|---|---|
| | Second solid electrolyte | | Second binder | | |
| | Material | Content (% by weight) | Material | Content (% by weight) | Thickness (μm) |
| Example 1 | $Li_6PS_5Cl$ | 99.5 | PTFE | 0.5 | 600 |
| Example 2 | $Li_6PS_5Cl$ | 98 | PTFE | 2 | 600 |
| Example 3 | $Li_6PS_5Cl$ | 98 | PTFE | 2 | 600 |
| Comparative Example 1 (wet) | $Li_6PS_5Cl$ | 99.5 | PTFE | 0.5 | impossible to manufacture |
| Comparative Example 2 (wet) | — | — | — | — | 50 |
| Comparative Example 3 | — | — | — | — | 200 |
| Comparative Example 4 | $Li_6PS_5Cl$ | 99.5 | PTFE | 0.5 | 400 |
| Comparative Example 5 | $Li_6PS_5Cl$ | 98 | PTFE | 2 | 400 |

Example 1

1-1. Manufacture of First and Second Solid Electrolyte Layers

The first and second solid electrolyte layers were prepared by a dry process without using a solvent as follows.

The mixture obtained by mixing $Li_6PS_5Cl$ powder, which is a sulfide-containing solid electrolyte, as a first solid electrolyte, with PTFE particles (polytetrafluoroethylene, Chemours) which is a first binder, in a mortar, was subjected to a calendaring loop 5 times with a roll press under the conditions of a temperature of 90° C. and a biaxial orientation to produce a first solid electrolyte layer with a thickness of 200 μm. The first solid electrolyte and the first binder were mixed in amounts of 99.8% by weight and 0.2% by weight, respectively.

The mixture obtained by mixing $Li_6PS_5Cl$ powder, which is a sulfide-containing solid electrolyte, as a second solid electrolyte, with PTFE particles (polytetrafluoroethylene, Chemours) which is a second binder, in a mortar, was subjected to a calendaring loop 30 times with a roll press under the conditions of a temperature of 90° C. and a biaxial orientation to produce a second solid electrolyte layer with a thickness of 400 μm. The second solid electrolyte and the second binder were mixed in amounts of 99.5% by weight and 0.5% by weight, respectively.

1-2. Manufacture of Solid Electrolyte Membrane

A solid electrolyte membrane was manufactured by stacking the second solid electrolyte layer on one side of the first solid electrolyte layer and bonding it under pressure of 5 MPa. The thickness of the solid electrolyte membrane is 600 μm.

1-3. Manufacture of all-Solid-State Battery

An all-solid-state battery was manufactured by sequentially stacking a positive electrode (NCM811, LGChem), the solid electrolyte membrane manufactured in 1-2 above, and a negative electrode (Si powder, Alfa Aesar). In this case, the first solid electrolyte layer of the solid electrolyte membrane was brought into contact with the negative electrode.

Example 2

A solid electrolyte membrane and an all-solid-state battery were manufactured in the same manner as Example 1, except that the second solid electrolyte and the second binder were mixed in amounts of 98% by weight and 2% by weight, respectively, and the calendaring loop was performed 30 times for the second solid electrolyte and the second binder.

Example 3

A solid electrolyte membrane was manufactured in the same manner as Example 1, except that the thickness of the second solid electrolyte layer was 200 μm.

Comparative Example 1

It was intended to manufacture a solid electrolyte membrane and an all-solid-state battery in the same manner as Example 1, except that the first and second solid electrolyte layers were manufactured by a wet process using a solvent as shown below.

For the wet process, xylene solvent, which is stable to sulfide-containing solid electrolyte, was used.

A solution was prepared by dissolving PTFE particles, as the first binder, in xylene solvent at a concentration of 0.2% by weight. The prepared solution was mixed with $Li_6PS_5Cl$ powder which is a sulfide-containing solid electrolyte as the first solid electrolyte, to obtain a mixture, and the mixture was coated on a PET (polyethylene terephthalate) release film with a doctor blade, followed by vacuum drying at 100° C. for 12 hours to form a first solid electrolyte layer. However, due to weak adhesion, the first solid electrolyte layer was not manufactured in the form of a membrane. Therefore, it was impossible to manufacture a solid electrolyte membrane in which the first solid electrolyte layer and the second solid electrolyte layer were stacked.

Comparative Example 2

98% by weight of $Li_6PS_5Cl$ as a sulfide-containing solid electrolyte and 2% by weight of SEBS (styrene-ethylene-butylene-styrene) as a binder were mixed with xylene as a solvent to prepare a slurry. At this time, the concentration of the slurry was set to 60% by weight of the sulfide-containing solid electrolyte and 40% by weight of the solvent.

The slurry was coated on a PET (polyethylene terephthalate) release film with a doctor blade and dried at a temperature of 80° C. to prepare a solid electrolyte membrane having a thickness of 50 μm.

The binder was in the form of a particulate because it had not gone through the calendaring process an appropriate number of times.

Comparative Example 3

As a solid electrolyte membrane, only the first solid electrolyte layer from Example 1 containing a particulate binder was used.

Comparative Example 4

As a solid electrolyte membrane, only the second solid electrolyte layer of Example 1 containing a fibrous binder was used.

Comparative Example 5

As a solid electrolyte membrane, only the second solid electrolyte layer prepared in Example 2 was used.

Experimental Example 1: Measurement of Ionic Conductivity of Solid Electrolyte Membrane In order to confirm the ionic conductivity according to the shape of the binder contained in the solid electrolyte membrane and the type of the solid electrolyte membrane, ionic conductivity was measured in the following manner.

In order to measure the ionic conductivity of the solid electrolyte membrane, the solid electrolyte membrane was placed in a polyether ether ketone (PEEK) holder with a diameter of 10 mm, and ionic conductivity was measured using a titanium rod as a blocking electrode.

After measuring resistance using an electrochemical impedance spectrometer (EIS, VM3, Bio Logic Science Instrument) at 25° C. under conditions of amplitude 10 mV and scan range from 1 Hz to 0.1 MHz, the ionic conductivity of the solid electrolyte membrane was calculated using Equation 1 below.

$$\sigma_i = \frac{L}{RA}$$ [Equation 1]

wherein, $\sigma_i$ is the ionic conductivity (mS/cm) of the solid electrolyte membrane, R is the resistance (Ω) of the solid electrolyte membrane measured with the electrochemical impedance spectrometer, L is the thickness (μm) of the solid electrolyte membrane, and A refers to the area (cm$^2$) of the solid electrolyte membrane.

The measured ionic conductivity values are listed in Table 2 below.

TABLE 2

|  | Ionic conductivity (mS/cm) |
| --- | --- |
| Example 1 | 1.616 |
| Example 2 | 1.532 |
| Example 3 | 1.995 |
| Comparative Example 1 | — |
| Comparative Example 2 | 0.916 |
| Comparative Example 3 | 2.125 |
| Comparative Example 4 | 1.865 |
| Comparative Example 5 | 1.26 |

Referring to Table 2 above, the solid electrolyte membranes of Examples 1 to 3 showed ionic conductivity that was applicable to an all-solid-state battery.

In addition, Comparative Example 1 attempted to manufacture a solid electrolyte membrane including the first solid electrolyte layer and the second solid electrolyte layer by a wet process, but since PTFE, as the first and second binder, has the property of being soluble in xylene solvent, it was not manufactured in the form of a film, and thus it is impossible to measure the ionic conductivity.

In addition, it was confirmed that Comparative Example 2 used SEBS as a binder, which is insoluble in xylene solvent, but the solid electrolyte membrane was manufactured by a wet process using a relatively large amount of binder at 2% by weight, and thus the ionic conductivity was relatively lower than Examples 1 to 3.

In addition, Comparative Example 3 showed that a solid electrolyte membrane, which is the first solid electrolyte layer manufactured by dry process in Example 1 (calendaring loops 5 times) had low content of the first binder at 0.2% by weight, and that since it was in a single-layer form, the number of calendaring loops is small, and the first binder is in particulate form, the ionic conductivity was higher than that of Example 1. However, since it is a single-layer form, it may be predicted that its strength will be weaker than that of Example 1, which is a double-layer form.

In addition, Comparative Example 4 showed that a solid electrolyte membrane, which is the second solid electrolyte layer manufactured by dry process in Example 1 (calendaring loops 30 times) had low content of the second binder at 0.5% by weight, and that since it was in a single-layer form, the ionic conductivity was high at a similar level to Example 1. However, since the solid electrolyte membrane was in a single-layer form, it may be predicted that its strength will be weaker than that of Example 1, which is in a double-layer form.

In addition, Comparative Example 5 showed that a solid electrolyte membrane, which is the second solid electrolyte layer manufactured by dry process in Example 2 (calendaring loops 30 times) had high content of the second binder at 2% by weight, the second binder has a fibrous form due to the large number of calendaring loops, and thus the strength may be increased, but the ionic conductivity was somewhat low. Further, since the solid electrolyte membrane was in a single-layer form, it may be predicted that its strength will be weaker than that of Example 2, which is in a double-layer form.

Experimental Example 2: Correlation Between Shape of Binder and Performance of all-Solid-State Battery An experiment was conducted to confirm the effect of the shape of the binder contained in the solid electrolyte membrane on the performance of the all-solid-state battery.

The all-solid-state battery was designed to include a positive electrode (NCM811:LPSCl:VGCF(Vapor Grown Carbon Fiber)=66:31:3 (wt %)), a negative electrode (Li, Li—In, or Si), and a sulfide-containing solid electrolyte membrane (SSE, solid-state electrolyte) interposed between them.

Figure 2A:
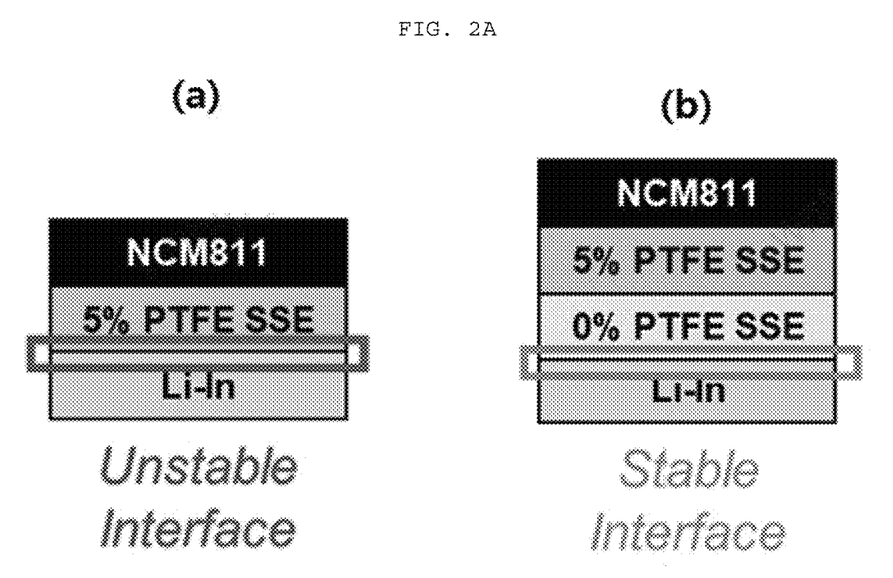
FIG. 2A is a schematic diagram of an all-solid-state battery manufactured for performance testing depending on the shape of the binder included in the sulfide-containing solid electrolyte membrane.

The sulfide-containing solid electrolyte membrane included in the all-solid-state battery in (a) of FIG. 2A was set to have a fibrous PTFE binder content of 5 wt % (5 wt % PTFE SSE) according to a method for manufacturing the second sulfide-containing solid electrolyte layer of Example 1.

The sulfide-containing solid electrolyte membrane included in the all-solid-state battery in (b) of FIG. 2A was formed as a double layer, and the double layer includes a sulfide-containing solid electrolyte membrane (0 wt % PTFE SSE) that does not contain a fibrous PTFE binder, and a sulfide-containing solid electrolyte membrane (5 wt % PTFE SSE) with a content of 5 wt % PTFE, a fibrous PTFE binder. An all-solid-state battery was manufactured by placing a sulfide-containing solid electrolyte membrane (0 wt % PTFE SSE) that does not contain the binder in contact with a negative electrode (Li—In).

Figure 2B:
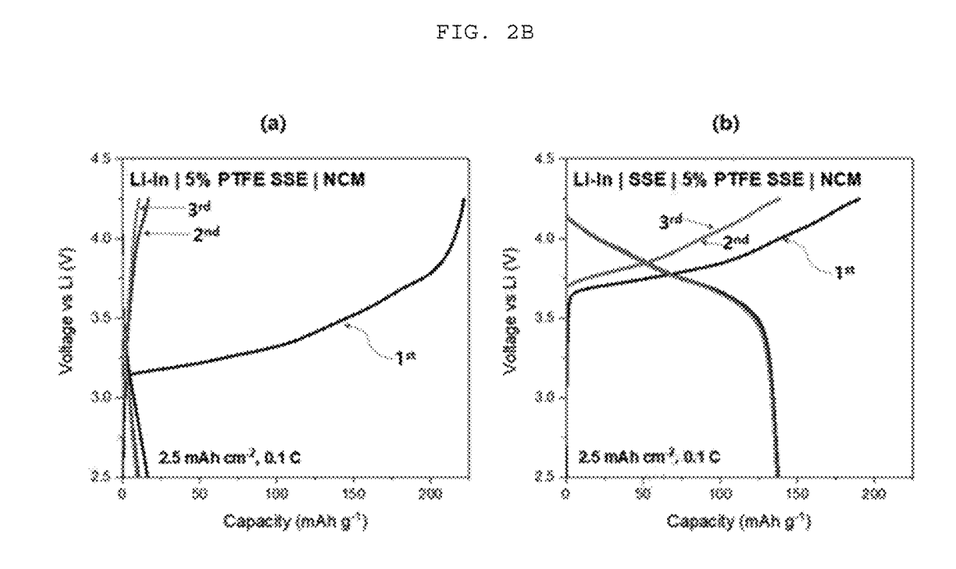
FIG. 2B is a charging/discharging curve for the all-solid-state battery having a structure shown in FIG. 2A.

FIG. 2B is a charging/discharging curve for an all-solid-state battery having the structure shown in FIG. 2A (positive electrode loading: 2.5 mAh·cm$^{-2}$; C rate: 0.1 C). (a) and (b) of FIG. 2B are charge/discharge curves for the all-solid-state battery corresponding to (a) and (b) in FIG. 2A, respectively.

Referring to (a) of FIG. 2B, it may be seen that in the all-solid-state battery, when the sulfide-containing solid electrolyte membrane containing the fibrous PTFE binder comes into contact with the negative electrode, normal operation of the battery is difficult due to side reactions between the fibrous PTFE binder and the negative electrode.

Referring to (b) of FIG. 2B, it may be seen that when a sulfide-containing solid electrolyte membrane that does not contain a fibrous PTFE binder is formed on the surface in contact with the negative electrode, since side reactions between the fibrous PTFE binder and the negative electrode are prevented, the lifetime of the all-solid-state battery is improved.

Figure 3A:
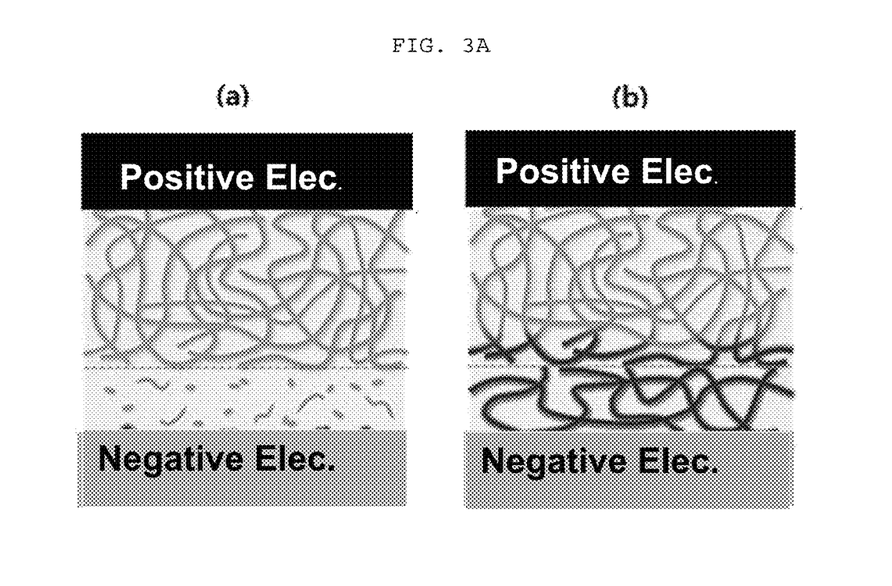
FIG. 3A is a schematic diagram of an all-solid-state battery manufactured for performance testing depending on the shape of the binder included in the sulfide-containing solid electrolyte membrane.

(a) of FIG. 3A shows the double-layer structure of the sulfide-containing solid electrolyte membrane included in the all-solid-state battery. According to the manufacturing method of the sulfide-containing solid electrolyte membrane of Example 1, the first solid electrolyte layer contained 0.5% by weight of particulate PTFE binder, and the second solid electrolyte layer contained a fibrous PTFE binder. In the first solid electrolyte layer, a calendaring loop was performed five times to ensure that the PTFE binder became particulate.

(b) of FIG. 3A shows the double-layer structure of the sulfide-containing solid electrolyte membrane included in the all-solid-state battery. The calendaring process was performed 5 times and 30 times for the first solid electrolyte layer and the second solid electrolyte layer, respectively, of the sulfide-containing solid electrolyte membrane in Example 1 to ensure that 0.5% by weight of fibrous PTFE binder was included.

Figure 3B:
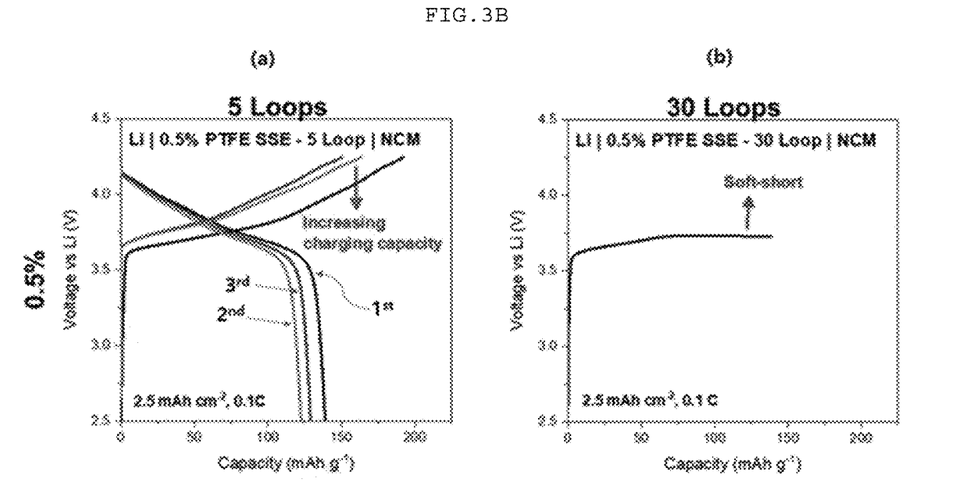
FIG. 3B is a charging/discharging curve for an all-solid-state battery having a structure shown in FIG. 3A.

FIG. 3B is a charging/discharging curve for the all-solid-state battery having the structure shown in FIG. 3A (positive electrode loading: 2.5 mAh·cm$^{-2}$; C rate: 0.1 C). (a) and (b) in FIG. 3B are charging/discharging curves for the all-solid-state battery corresponding to (a) and (b) in FIG. 3A, respectively.

Referring to (a) of FIG. 3B, it may be seen that in the all-solid-state battery, when the sulfide-containing solid electrolyte membrane containing a particulate PTFE binder rather than a fibrous PTFE binder comes into contact with the negative electrode, the side reactions between the particulate PTFE binder and the negative electrode are terminated early, increasing the charging capacity of the all-solid-state battery.

Referring to (b) of FIG. 3B, it may be seen that in the all-solid-state battery, when the sulfide-containing solid electrolyte membrane containing the fibrous PTFE binder comes into contact with the negative electrode, normal operation of the battery is difficult due to a side reaction between the fibrous PTFE binder and the negative electrode. In addition, the side reactions may continue along the fibrous PTFE binder and eventually reach the positive electrode, resulting in a soft short.

Therefore, it was confirmed that for normal operation and performance improvement of the all-solid-state battery, it is more advantageous for the binder included in the sulfide-containing solid electrolyte membrane adjacent to the negative electrode to be particulate rather than fibrous.

Experimental Example 3: Evaluation of Cycle Characteristics of all-Solid-State Battery The cycle characteristics of the all-solid-state battery manufactured in Example 1 were evaluated. The all-solid-state battery manufactured in Example 1 is a full cell that includes a negative electrode (Si), a double-layer solid electrolyte membrane (Bilayer SSE-1), and a positive electrode (NCM).

In the method of evaluating the cycle characteristics of the all-solid-state battery, the maintenance rate of the discharge capacity was evaluated by charging and discharging at room temperature under a constant loading amount of the positive electrode, a constant current rate (C rate), and a constant capacity ratio (N/P Ratio) of the negative electrode/positive electrode.

Figure 4:
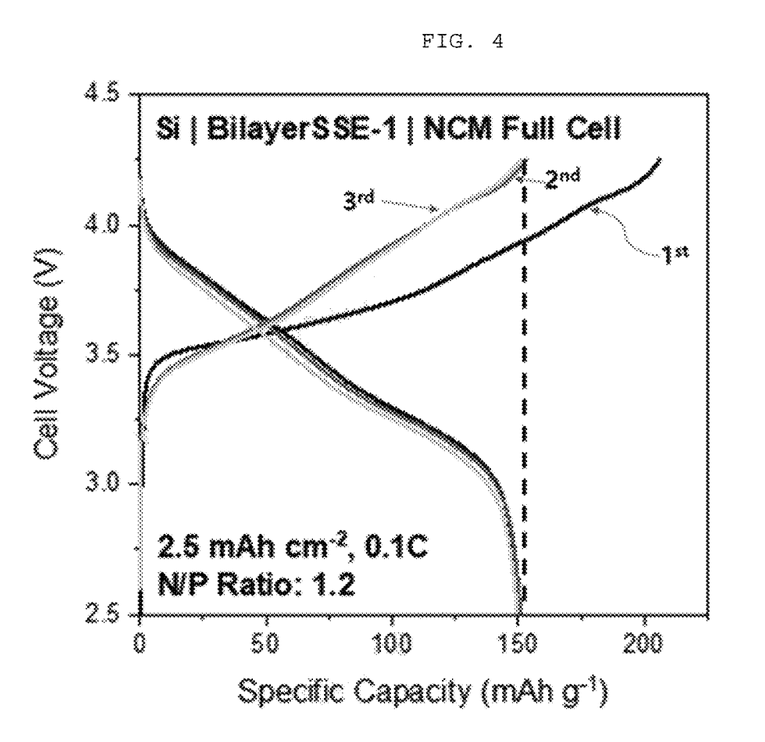
FIG. 4 is a charging/discharging curve for the all-solid-state battery manufactured in Example 1.

FIG. 4 is a charging/discharging curve for the all-solid-state battery manufactured in Example 1 (positive electrode loading: 2.5 mAh·cm$^{-2}$; C rate: 0.1 C; N/P Ratio: 1.2).

Referring to FIG. 4, it may be seen that the maintenance rate of discharging capacity of the all-solid-state battery manufactured in Example 1 is high.

In addition, an experiment on cycle performance was conducted by measuring discharging capacity up to 200 cycles for the all-solid-state battery in Example 1 (positive electrode loading: 2.5 mAh·cm$^{-2}$; C rate: 0.33 C; N/P Ratio: 1.2). As a result, it was confirmed that the discharging capacity of the all-solid-state battery in Example 1 was maintained at a similar level even up to 200 cycles.

In the above, although the present disclosure has been described by way of limited examples and drawings, the present disclosure is not limited thereto, and it is apparent that various modifications and variations may be made by those skilled in the art to which the present disclosure pertains within the equivalent scope of the technical spirit of the present disclosure and the claims to be described below.

DESCRIPTION OF SYMBOL

1: Solid electrolyte membrane
10: First solid electrolyte layer
10a: First solid electrolyte
10b: Particulate binder
20: Second solid electrolyte layer
20a: Second solid electrolyte
20b: Fibrous binder
30: positive electrode
40: negative electrode

The invention claimed is:

1. A solid electrolyte membrane, comprising:
a first solid electrolyte layer; and
a second solid electrolyte layer on one side of the first solid electrolyte layer,
wherein the first solid electrolyte layer comprises a first solid electrolyte and a particulate binder, wherein a weight of the particulate binder exceeds 0% by weight and is 2% by weight or less based on a total weight of the first solid electrolyte layer,
wherein the second solid electrolyte layer comprises a second solid electrolyte and a fibrous binder, wherein a weight of the fibrous binder is 0.01 to 5% by weight based on a total weight of the second solid electrolyte layer, and wherein the solid electrolyte membrane is substantially free of solvent.

2. The solid electrolyte membrane according to claim 1, wherein a content of the first solid electrolyte in the first solid electrolyte layer is 98% by weight or more based on a total weight of the first solid electrolyte layer.

3. The solid electrolyte membrane according to claim 1, wherein a content of the second solid electrolyte in the second solid electrolyte layer is 95% by weight to 99.99% by weight based on a total weight of the second solid electrolyte layer.

4. The solid electrolyte membrane according to claim 1, wherein the particulate binder and the fibrous binder each independently comprise at least one selected from the group consisting of polytetrafluoroethylene (PTFE), ethylene-vinyl acetate (EVA), styrene-ethylene-butylene-styrene (SEBS) and copolymers thereof.

5. The solid electrolyte membrane according to claim 1, wherein the first solid electrolyte or the second solid electrolyte is a sulfide-containing solid electrolyte, a halide-containing solid electrolyte, or an oxide-containing solid electrolyte.

6. The solid electrolyte membrane according to claim 1, wherein a thickness of the solid electrolyte membrane is 20 µm to 700 µm.

7. The solid electrolyte membrane according to claim 1, wherein an ionic conductivity of the solid electrolyte membrane is 0.5 to 10 mS/cm.

8. The solid electrolyte membrane according to claim 1, wherein the solid electrolyte membrane is solvent-free.

9. The solid electrolyte membrane according to claim 1, wherein the first solid electrolyte layer consists of the first solid electrolyte and the particulate binder, and the second solid electrolyte layer consists of the second solid electrolyte and the fibrous binder.

10. The solid electrolyte membrane according to claim 1, wherein no solvent is used in the preparation of the first and second solid electrolyte layers.

11. The solid electrolyte membrane according to claim 1, wherein the particulate binder and the fibrous binder comprise polytetrafluoroethylene (PTFE), and wherein the first solid electrolyte and the second solid electrolyte comprise $Li_6PS_5Cl$.

12. A method of manufacturing a solid electrolyte membrane according to claim 1, comprising:

manufacturing the first solid electrolyte layer and the second solid electrolyte layer, respectively, and then bonding the first solid electrolyte layer and the second solid electrolyte layer, wherein the first solid electrolyte layer is prepared by the following steps (A1) and (A2):

(A1) mixing first solid electrolyte particles and a first binder; and (A2) applying a mixture obtained in step (A1) to a first calendering process to form the first solid electrolyte layer, wherein the second solid electrolyte layer is prepared by the following steps (B1) and (B2):

(B1) mixing a second solid electrolyte and a second binder; and (B2) applying a mixture obtained in step (B1) to a second calendering process to form the second solid electrolyte layer, and wherein the first binder becomes the particulate binder, and the second binder is fiberized during mixing to become the fibrous binder.

13. The method for manufacturing the solid electrolyte membrane according to claim 12, wherein the temperature of the first and second calendering process is 50° C. to 200° C., respectively.

14. The method for manufacturing the solid electrolyte membrane according to claim 13, wherein the first calendering process is performed for 1 to 10 loops, and the second calendering process is performed for 5 to 50 loops.

15. The method for manufacturing the solid electrolyte membrane according to claim 12, wherein at one of the first calendering process and the second calendering process is performed uniaxially or biaxially.

16. The method for manufacturing the solid electrolyte membrane according to claim 12, wherein the first solid electrolyte layer consists of the first solid electrolyte and the particulate binder, and the second solid electrolyte layer consists of the second solid electrolyte and the fibrous binder.

17. The method for manufacturing the solid electrolyte membrane according to claim 12, wherein no solvent is used in the preparation of the first and second solid electrolyte layers.

18. The method for manufacturing the solid electrolyte membrane according to claim 12, wherein the particulate binder and the fibrous binder comprise polytetrafluoroethylene (PTFE), and wherein the first solid electrolyte and the second solid electrolyte comprise $Li_6PS_5Cl$.

19. An all-solid-state battery comprising a positive electrode, a negative electrode and the solid electrolyte membrane of claim 1 interposed between them.

20. The all-solid-state battery according to claim 19, wherein the first solid electrolyte layer of the solid electrolyte membrane is adjacent to the negative electrode.

* * * * *